US011055399B2

(12) United States Patent
Sanders et al.

(10) Patent No.: US 11,055,399 B2
(45) Date of Patent: Jul. 6, 2021

(54) DATA RECOVERY THROUGH REVERSAL OF HASH VALUES USING PROBABILISTIC DATA STRUCTURES

(71) Applicant: NOBLIS, INC., Reston, VA (US)

(72) Inventors: Mark Sanders, Ashburn, VA (US); Tyler W. Barrus, Midlothian, VA (US)

(73) Assignee: NOBLIS, INC., Reston, VA (US)

( * ) Notice: Subject to any disclaimer, the term of this patent is extended or adjusted under 35 U.S.C. 154(b) by 345 days.

(21) Appl. No.: 16/253,950

(22) Filed: Jan. 22, 2019

(65) Prior Publication Data
US 2019/0236267 A1 Aug. 1, 2019

Related U.S. Application Data

(60) Provisional application No. 62/622,422, filed on Jan. 26, 2018.

(51) Int. Cl.
*G06F 21/00* (2013.01)
*G06F 21/46* (2013.01)
(Continued)

(52) U.S. Cl.
CPC .......... *G06F 21/46* (2013.01); *G06F 16/2255* (2019.01); *G06F 16/3346* (2019.01);
(Continued)

(58) Field of Classification Search
CPC .. G06F 21/46; G06F 16/2255; G06F 16/3346; G06F 2221/2131; G06F 2209/56; H04L 9/0643; H04L 9/0894
See application file for complete search history.

(56) References Cited

U.S. PATENT DOCUMENTS 8,290,972 B1 * 10/2012 Deshmukh ........ G06F 16/24556
707/758
8,898,204 B1 * 11/2014 Sathe ...................... G06F 16/00
707/812
(Continued)

OTHER PUBLICATIONS

Bloom, B.H. (Jul. 1970). "Space/Time Trade-offs in Hash Coding with Allowable Errors," Communications of the ACM 13(7): 422-426.
(Continued)

*Primary Examiner* — Shin-Hon (Eric) Chen
(74) *Attorney, Agent, or Firm* — Morrison & Foerster LLP

(57) ABSTRACT

Systems and methods for recovering passwords from a hash value input are provided. A password space may be segmented into password sets, and a digest set may be generated for each password set. Probabilistic data structures representing the digest sets may be generated. One of the probabilistic data structures may be queried with the hash value input to determine whether the hash value input is likely included in the digest sets. In response to the hash value input being determined to be likely included in the digest set, the passwords constituting the password set corresponding to the digest set may be regenerated, and the hash values constituting the digest set may be regenerated. The generated hash values may be compared to the hash value input to determine a hash value from the digest set that matches the hash value input to recover the password associated with the matched hash value.

18 Claims, 5 Drawing Sheets

(51) Int. Cl.
*G06F 16/33* (2019.01)
*H04L 9/06* (2006.01)
*G06F 16/22* (2019.01)
*H04L 9/08* (2006.01)

(52) U.S. Cl.
CPC .......... *H04L 9/0643* (2013.01); *H04L 9/0894* (2013.01); *G06F 2221/2131* (2013.01); *H04L 2209/56* (2013.01)

(56) References Cited

U.S. PATENT DOCUMENTS

| | | | |
|---|---|---|---|
| 9,817,944 | B2 | 11/2017 | Kural |
| 10,642,994 | B1* | 5/2020 | Allen .................... H04L 9/0861 |
| 10,790,984 | B1* | 9/2020 | Stiles .................... G06F 16/955 |
| 2008/0040047 | A1 | 2/2008 | Nelson et al. |
| 2008/0306694 | A1 | 12/2008 | Izmailov et al. |
| 2008/0313132 | A1* | 12/2008 | Hao ........................ H04L 45/00 |
| 2009/0030895 | A1* | 1/2009 | Eswaran ............. G06F 16/9014 |
| 2009/0241187 | A1* | 9/2009 | Troyansky .......... H04L 63/1433 726/22 |
| 2011/0098193 | A1 | 4/2011 | Kingsmore et al. |
| 2011/0225191 | A1* | 9/2011 | Xie ........................ G06F 16/22 707/775 |
| 2013/0244614 | A1* | 9/2013 | Santamaria ......... H04W 12/069 455/411 |
| 2014/0238937 | A1 | 8/2014 | Mcginnis |
| 2014/0274752 | A1 | 9/2014 | Blume et al. |
| 2015/0220684 | A1 | 8/2015 | Greenfield |
| 2016/0132640 | A1 | 5/2016 | Layer et al. |
| 2016/0179893 | A1* | 6/2016 | He ...................... G06F 16/9535 707/723 |
| 2016/0344849 | A1 | 11/2016 | Thomas |
| 2017/0068776 | A1 | 3/2017 | Godinez-Moreno et al. |
| 2017/0070492 | A1* | 3/2017 | Rubin .................... G06F 21/645 |
| 2018/0011852 | A1* | 1/2018 | Bennett ............... G06F 16/2272 |
| 2018/0089365 | A1 | 3/2018 | Beal et al. |
| 2018/0248698 | A1* | 8/2018 | Kominar ................. G06F 21/45 |
| 2018/0330052 | A1 | 11/2018 | Barrus |
| 2018/0330054 | A1 | 11/2018 | Omari et al. |
| 2019/0155835 | A1 | 5/2019 | Daugharthy et al. |
| 2019/0318807 | A1 | 10/2019 | O'Hara et al. |

OTHER PUBLICATIONS

Hellman, M.E (Jul. 1980). "A Cryptanalytic Time-Memory Trade-Off," IEEE Transactions on Information Theory 26(4): 401-406.

Barrus, U.S. Office Action dated Aug. 24, 2020, directed to U.S. Appl. No. 15/977,646; 29 pages.

Barrus, U.S. Office Action dated Dec. 22, 2020, directed to U.S. Appl. No. 15/977,646; 14 pages.

Omari et al., U.S. Office Action dated Oct. 29, 2020, directed to U.S. Appl. No. 15/977,667; 23 pages.

Omari et al., U.S. Office Action dated Mar. 3, 2020, directed to U.S. Appl. No. 15/977,667; 19 pages.

\* cited by examiner

DATA RECOVERY THROUGH REVERSAL OF HASH VALUES USING PROBABILISTIC DATA STRUCTURES

CROSS-REFERENCE TO RELATED APPLICATIONS

This application claims the benefit of U.S. Provisional Application No. 62/622,422, entitled, "DATA RECOVERY THROUGH REVERSAL OF HASH VALUES USING PROBABILISTIC DATA STRUCTURES," filed Jan. 26, 2018, the entire contents of which are incorporated herein by reference.

FIELD OF THE INVENTION

The present invention generally relates to systems and methods for recovering sensitive data, and more specifically to reversing hash values of sensitive data using searching techniques leveraging probabilistic data structures.

BACKGROUND OF THE INVENTION

Sensitive data (e.g., passwords and/or financial account information) in most secure systems are stored in databases in the form of hash values instead of as plaintext to make these databases less vulnerable to attacks. These sensitive data may be used to authenticate a user's access to the secure system.

However, recovering these sensitive data may be necessary in certain circumstances. For example, during investigations by law enforcement agencies password-protected systems may need to be accessed, and a password hash may need to be reversed to recover the password of the password-protected system. Also, in some cases passwords of encrypted files may be lost or forgotten, in which case a password recovery would be necessary.

Some of the traditional methods used for recovering passwords are brute-force and dictionary based attacks. With brute-force, the attacker attempts to try all possible password combinations, while in dictionary attack, the attacker tries to determine password by trying thousands or sometimes millions of likely possibilities, such as words in a dictionary.

SUMMARY OF THE INVENTION

The traditional systems and methods for recovering sensitive data such as, for example, passwords or financial information from stored encoded values (e.g., hash values) require considerable amount of processing time and/or computing resources (e.g., large memory storage), particularly for recovering large and complex data. Such traditional systems and methods are time- and cost-inefficient for practical applications in environments (e.g., in law enforcement agencies or in small businesses) that may be limited by the amount of time and/or resources available for such data recovery systems and methods. In addition, the large computing resources required in these traditional systems and methods make them impractical for applications in portable devices.

Accordingly, there is need for systems and methods for data recovery that helps to overcome the drawbacks in the traditional data recovery systems and methods. The present disclosure may address this need by providing techniques and systems for faster, more efficient, and more computationally inexpensive methods for recovering passwords from encoded values (e.g., hash values). In some embodiments, these faster and more efficient methods may comprise using probabilistic data structures such as Bloom filters to drastically speed up the process of searching through the entirety of a password space, or through the entirety of a digest space corresponding to the password space. In some embodiments, the techniques disclosed herein comprise segmenting a password space having all possible passwords for a given set of password generation rules (e.g., all possible passwords considering permissible character sets and/or a maximum and/or minimum password length) into password sets, and generating and storing probabilistic data structures corresponding to and representing the password sets. The probabilistic data structures may then be queried with query values to search for a potential match between the query value and an underlying value used to build the probabilistic data structure, which may be significantly faster and more efficient than exhaustively comparing the query value to every possible match. By segmenting the password space into password sets and using probabilistic data structures to determine the password sets that are likely to have the password of the input query hash value, the techniques disclosed herein may reduce the targeted search areas of the password space for password recovery, and may thereby reduce the processing time and computational resources required for password recovery. In addition, the use of probabilistic data structures such as, for example, Bloom filters, for representing digest sets corresponding to password sets may enable implementation of the password recovery techniques of the present disclosure on consumer-grade computing devices and mobile devices, rather than requiring expensive and scarce powerful computational resources.

In some embodiments, a method for recovering a password from a hash value input is provided, the method comprising: segmenting a password space into a plurality of password sets, wherein each of the password sets comprise a plurality of passwords in the password space; generating and storing a digest set for each password set of the plurality of password sets, wherein each of the digest sets comprises a respective hash value of each of the respective passwords in the corresponding password set; generating and storing a plurality of probabilistic data structures, wherein each of the plurality of probabilistic data structures represents one of the plurality of the digest sets; querying one of the probabilistic data structures with the hash value input to determine whether the hash value input is likely included in the digest sets represented by the probabilistic data structures; receiving, in response to the querying of the probabilistic data structure, result data from the probabilistic data structure indicating that the hash value input is likely included in the digest set represented by the probabilistic data structure; in response to receiving the result data indicating that the hash value input is likely included in the digest set represented by the probabilistic data structure, generating and storing the passwords constituting the password set corresponding to the digest set, and generating and storing the hash values constituting the digest set; comparing the generated hash values constituting the digest set to the hash value input to determine a hash value from among the digest set that matches the hash value input; and generating and outputting an indication of the generated password associated with the hash value from among the digest set that matches the hash value input.

In some embodiments of the method, segmenting the password space comprises generating and storing data representing the plurality of password sets in the password space.

In some embodiments of the method, the password space is comprises all possible passwords in accordance with a plurality of rules governing password eligibility.

In some embodiments of the method, passwords in the password space are arranged in an order in accordance with one or more predefined ordering criteria.

In some embodiments of the method, each password set of the plurality of password sets comprises a contiguous portion of the password space as defined by the predefined ordering criteria, and is non-overlapping with each other password sets of the plurality of password sets.

In some embodiments of the method, each password set of the plurality of password sets comprises an equal number of passwords.

In some embodiments of the method, generating a digest set for each password set comprises calculating a respective hash value for each password of the password set.

In some embodiments of the method, generating a probabilistic data structure comprises selecting a predefined false-positive probability for queries of the probabilistic data structure.

In some embodiments of the method, selecting the predefined false-positive probability is based on a size of storage resources on which the probabilistic data structure is to be stored.

In some embodiments of the method, the probabilistic data structure is configured to generate result data indicating either: that the query input value is likely included in the digest set represented by the probabilistic data structure, or that the query input value is definitely not included in the digest set represented by the probabilistic data structure.

In some embodiments of the method, the probabilistic data structure is a Bloom filter.

In some embodiments, a system for recovering a password from a hash value input is provided, the system comprising: one or more processors; a memory storing one or more programs, the one or more programs configured to be executed by the one or more processors and including instructions to: segment a password space into a plurality of password sets, wherein each of the password sets comprise a plurality of passwords in the password space; generate and store a digest set for each password set of the plurality of password sets, wherein each of the digest sets comprises a respective hash value of each of the respective passwords in the corresponding password set; generate and store a plurality of probabilistic data structures, wherein each of the plurality of probabilistic data structures represents one of the plurality of the digest sets; query one of the probabilistic data structures with the hash value input to determine whether the hash value input is likely included in the digest sets represented by the probabilistic data structures; receive, in response to the querying of the probabilistic data structure, result data from the probabilistic data structure indicating that the hash value input is likely included in the digest set represented by the probabilistic data structure; in response to receiving the result data indicating that the hash value input is likely included in the digest set represented by the probabilistic data structure, generate and store the passwords constituting the password set corresponding to the digest set, and generate and store the hash values constituting the digest set; compare the generated hash values constituting the digest set to the hash value input to determine a hash value from among the digest set that matches the hash value input; and generate and output an indication of the generated password associated with the hash value from among the digest set that matches the hash value input.

In some embodiments, a non-transitory computer-readable storage medium storing one or more programs for recovering a password from a hash value input is provided, the one or more programs configured to be executed by one or more processors and including instructions to: segment a password space into a plurality of password sets, wherein each of the password sets comprise a plurality of passwords in the password space; generate and store a digest set for each password set of the plurality of password sets, wherein each of the digest sets comprises a respective hash value of each of the respective passwords in the corresponding password set; generate and store a plurality of probabilistic data structures, wherein each of the plurality of probabilistic data structures represents one of the plurality of the digest sets; query one of the probabilistic data structures with the hash value input to determine whether the hash value input is likely included in the digest sets represented by the probabilistic data structures; receive, in response to the querying of the probabilistic data structure, result data from the probabilistic data structure indicating that the hash value input is likely included in the digest set represented by the probabilistic data structure; in response to receiving the result data indicating that the hash value input is likely included in the digest set represented by the probabilistic data structure, generate and store the passwords constituting the password set corresponding to the digest set, and generate and store the hash values constituting the digest set; compare the generated hash values constituting the digest set to the hash value input to determine a hash value from among the digest set that matches the hash value input; and generate and output an indication of the generated password associated with the hash value from among the digest set that matches the hash value input.

In some embodiments, a method for recovering a password from a hash value input is provided, the method comprising: segmenting a password space into a plurality of password sets, wherein each of the password sets comprise a plurality of passwords in the password space; generating and storing a digest set for each password set of the plurality of password sets, wherein each of the digest sets comprises a respective hash value of each of the respective passwords in the corresponding password set; generating and storing a multi-level probabilistic data structure, wherein the generating and storing comprising: generating and storing a first plurality of probabilistic data structures in a first level of the multi-level probabilistic data structure; and generating and storing a second plurality of probabilistic data structures in a second level of the multi-level probabilistic data structure, wherein each of the probabilistic data structures of the multi-level probabilistic data structure respectively represent one or more of the plurality of the digest sets; querying a plurality of probabilistic data structures of the multi-level probabilistic data structure with the hash value input to determine whether the hash value input is likely included in any one or more of the digest sets respectively represented by the plurality of probabilistic data structures; receiving, in response to the querying of the plurality of probabilistic data structures of the multi-level probabilistic data structure, result data from an identified one of the plurality of data structures indicating that the hash value input is likely included in the digest set represented by the identified probabilistic data structure; in response to receiving the result data indicating that the hash value input is likely included in the digest set represented by the identified probabilistic data structure, generating and storing the passwords constituting the password set corresponding to the digest set, and generating and storing the hash values constituting the digest set; comparing the generated hash values constituting the digest set to the hash value input to determine a hash value from among the digest set that matches the hash value input; and generating and outputting an indication of the generated password associate with the hash value from among the digest set that matches the hash value input.

In some embodiments of the method, the multi-level probabilistic data structure comprises a tree-structure of probabilistic data structures in which a given probabilistic data structure in the first level is associated with multiple probabilistic data structures in the second level.

In some embodiments of the method, each of the multiple probabilistic data structures in the second level are represent single respective digest sets; and the given probabilistic data stricture in the first level represents all of the respective digest sets represented by each of the multiple probabilistic data structures in the second level.

In some embodiments of the method, querying a plurality of probabilistic data structures of the multi-level probabilistic data structure comprises: querying the given probabilistic data structure of the first level of the multi-level probabilistic data structure; receiving, in response to the querying of the given probabilistic data structure, result data indicating that the hash value input is likely included in one of the multiple digest sets represented by the given probabilistic data structure; in accordance with receiving the result data indicating that the hash value input is likely included in one of the multiple digest sets represented by the given probabilistic data structure, querying the multiple probabilistic data structures of the second level of the multi-level probabilistic data structure; receiving, in response to the querying the multiple probabilistic data structures of the second level, the result data indicating that the hash value input is likely included in the digest set represented by the identified probabilistic data structure, wherein the identified probabilistic data structure is one of the multiple probabilistic data structures.

In some embodiments of the method, the first plurality of probabilistic data structures are configured to have a first false-positive rate; and the second plurality of probabilistic data structures are configured to have a second false-positive rate different from the first false-positive rate.

In some embodiments, a system for recovering a password from a hash value input is provided, the system comprising: one or more processors; a memory storing one or more programs, the one or more programs configured to be executed by the one or more processors and including instructions to: segment a password space into a plurality of password sets, wherein each of the password sets comprise a plurality of passwords in the password space; generate and store a digest set for each password set of the plurality of password sets, wherein each of the digest sets comprises a respective hash value of each of the respective passwords in the corresponding password set; generate and store a first plurality of probabilistic data structures in a first level of a multi-level probabilistic data structure; and generate and store a second plurality of probabilistic data structures in a second level of the multi-level probabilistic data structure, wherein each of the probabilistic data structures of the multi-level probabilistic data structure respectively represent one or more of the plurality of the digest sets; query a plurality of probabilistic data structures of the multi-level probabilistic data structure with the hash value input to determine whether the hash value input is likely included in any one or more of the digest sets respectively represented by the plurality of probabilistic data structures; receive, in response to the querying of the plurality of probabilistic data structures of the multi-level probabilistic data structure, result data from an identified one of the plurality of data structures indicating that the hash value input is likely included in the digest set represented by the identified probabilistic data structure; in response to receiving the result data indicating that the hash value input is likely included in the digest set represented by the identified probabilistic data structure, generate and store the passwords constituting the password set corresponding to the digest set, and generate and store the hash values constituting the digest set; compare the generated hash values constituting the digest set to the hash value input to determine a hash value from among the digest set that matches the hash value input; and generate and output an indication of the generated password associate with the hash value from among the digest set that matches the hash value input.

In some embodiments, a non-transitory computer-readable storage medium storing one or more programs for recovering a password from a hash value input is provided, the one or more programs configured to be executed by one or more processors and including instructions to: segment a password space into a plurality of password sets, wherein each of the password sets comprise a plurality of passwords in the password space; generate and store a digest set for each password set of the plurality of password sets, wherein each of the digest sets comprises a respective hash value of each of the respective passwords in the corresponding password set; generate and store a first plurality of probabilistic data structures in a first level of a multi-level probabilistic data structure; and generate and store a second plurality of probabilistic data structures in a second level of the multi-level probabilistic data structure, wherein each of the probabilistic data structures of the multi-level probabilistic data structure respectively represent one or more of the plurality of the digest sets; query a plurality of probabilistic data structures of the multi-level probabilistic data structure with the hash value input to determine whether the hash value input is likely included in any one or more of the digest sets respectively represented by the plurality of probabilistic data structures; receive, in response to the querying of the plurality of probabilistic data structures of the multi-level probabilistic data structure, result data from an identified one of the plurality of data structures indicating that the hash value input is likely included in the digest set represented by the identified probabilistic data structure; in response to receiving the result data indicating that the hash value input is likely included in the digest set represented by the identified probabilistic data structure, generate and store the passwords constituting the password set corresponding to the digest set, and generate and store the hash values constituting the digest set; compare the generated hash values constituting the digest set to the hash value input to determine a hash value from among the digest set that matches the hash value input; and generate and output an indication of the generated password associate with the hash value from among the digest set that matches the hash value input.

BRIEF DESCRIPTION OF THE DRAWINGS

Illustrative embodiments will now be described with reference to the accompanying drawings. In the drawings, like reference numerals generally indicate identical, functionally similar, and/or structurally similar elements.

DETAILED DESCRIPTION OF THE INVENTION

Figure 1:
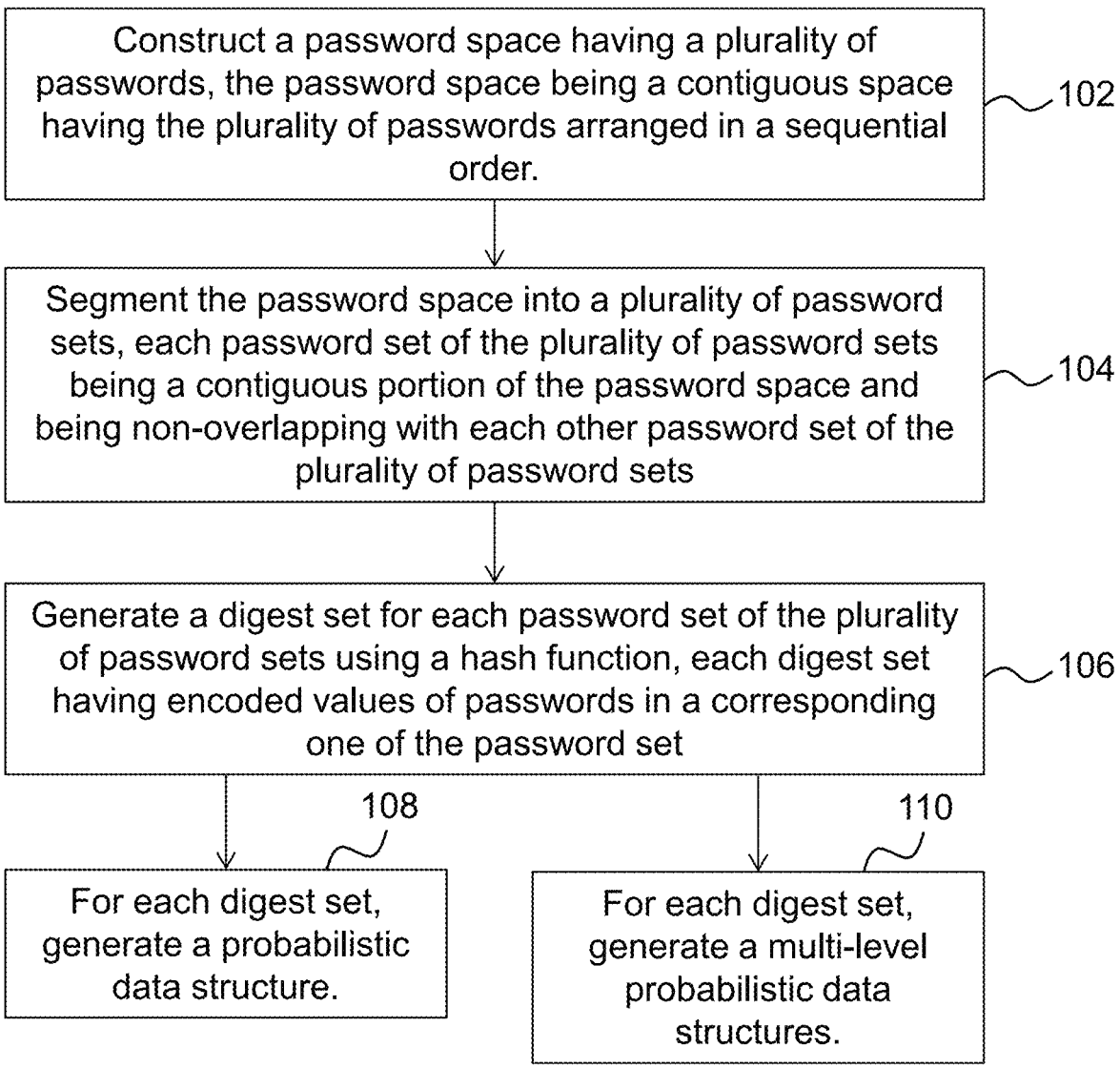
FIG. 1 shows a flow diagram depicting a method for encoding and storing data using probabilistic data structures in accordance with some embodiments.

The following description sets forth exemplary methods, parameters, and the like. It should be recognized, however, that such description is not intended as a limitation on the scope of the present disclosure but is instead provided as a description of exemplary embodiments.

FIGS. 1-7 provide a description of exemplary systems and methods for recovering passwords from hash values using probabilistic data structures. However, it will be understood by a person of ordinary skill in the art that these exemplary systems and methods of FIG. 1-7 may be used for recovering any data from their encoded values using probabilistic data structures. For example, these exemplary systems and methods may be used to recover credit card numbers from a database that may have only hashed values of the credit card numbers.

As discussed above, traditional systems and methods for recovering sensitive data such as, for example, passwords or financial information from stored encoded values (e.g., hash values) require considerable amounts of processing time and/or computing resources (e.g., large amounts of memory and/or substantial processing power), particularly for recovering large and complex data. Such traditional systems and methods are time- and cost-inefficient for practical applications in environments (e.g., in law enforcement agencies or in small businesses) that may be limited by the amount of time and/or resources available for such data recovery systems and methods. In addition, the computing resources required in these traditional systems and methods make them impractical for applications in portable devices.

Accordingly, there is need for systems and methods for data recovery that helps to overcome the drawbacks in the traditional data recovery systems and methods. The present disclosure may address this need by providing techniques and systems for faster, more efficient, and more computationally inexpensive methods for recovering passwords from encoded values (e.g., hash values). In some embodiments, these faster and more efficient methods may comprise using probabilistic data structures such as Bloom filters to drastically speed up the process of searching through the entirety of a password space, or through the entirety of a digest space corresponding to the password space. In some embodiments, the techniques disclosed herein comprise segmenting a password space having all possible passwords for a given set of password generation rules (e.g., all possible passwords considering permissible character sets and/or a maximum and/or minimum password length) into password sets, and generating and storing probabilistic data structures corresponding to and representing the password sets. The probabilistic data structures may then be queried with query values to search for a potential match between the query value and an underlying value used to build the probabilistic data structure, which may be significantly faster and more efficient than exhaustively comparing the query value to every possible match. By segmenting the password space into password sets and using probabilistic data structures to determine the password sets that are likely to have the password of the input query hash value, the techniques disclosed herein may reduce the targeted search areas of the password space for password recovery, and may thereby reduce the processing time and computational resources required for password recovery. In addition, the use of probabilistic data structures such as, for example, Bloom filters, for representing digest sets corresponding to password sets may enable implementation of the password recovery techniques of the present disclosure on consumer-grade computing devices and mobile devices, rather than requiring expensive and scarce powerful computational resources.

Below, FIGS. 1-5 describe a construction phase of a password recovery method and FIG. 6 describes a reversal phase of the password recovery method in accordance with some embodiments. As will be described below, the methods described in FIGS. 1-6 may enable fast, efficient, and accurate recovery of passwords from their hash values without the need for extensive computational, storage, or communication resources or capabilities. The methods described herein may thus enable the rapid recovery of passwords by probabilistically identifying and searching regions of a password space that likely has the desired password of a hash value that is being reversed, and may enable performing this probabilistic identification and searching on consumer-grade computing devices (e.g., laptops, smart phones, or single-board computers) within a matter of minutes or seconds.

FIG. 1 is a flow diagram of a construction phase of a password recovery method 100, according to some embodiments. In some embodiments, a password recovery method may comprise a construction phase in which one or more data structures to be used in the recovery technique are generated and stored, as well as a search phase (e.g., a query phase) in which specific queries may be executed in order to recover the desired password. In some embodiments, a construction phase may be performed in advance of a query phase. In some embodiments, the construction phase steps of the password recovery method 100 may not be performed more than once for any particular password space, such that a construction phase may be used to generate and store data structures that may be used for multiple search phases utilizing the same data structures. The method 100 may be performed by a system such as system 700 described below with reference to FIG. 7.

At step 102, in some embodiments, a password space having a plurality of passwords may be constructed. The password space construction may be performed by a processor such as processor 702 of system 700 described below with reference to FIG. 7.

In some embodiments, the password space may be represented by any data representing a logical space containing a plurality of potential/possible passwords in accordance with a set of parameters or rules for the passwords, such as all possible passwords in accordance with a set of password rules. In some embodiments, a password space may comprise a plurality of passwords arranged in a predefined order in accordance with one or more ordering conventions, such as numerical order, alphabetical order, or any suitable predefined order. In some embodiments, passwords in a password space may be stored in accordance with metadata or some other indication indicating a position or space of each particular password in the password space, such as by indicating its position with respect to the other passwords in the space as defined by the predefined ordering convention.

In some embodiments, data representing the password space may be generated and stored based on a set of password space generation instructions configured to systematically generate a plurality of passwords in the password space, such as all possible passwords in the password space in accordance with predefined rules governing possible passwords in the space. In some embodiments, the rules defining a password space may include rules about permissible characters that may be included in the passwords (e.g., numeric characters, alphabetical characters of one or more alphabets, symbolic characters, non-alphanumeric characters, or any combinations thereof), rules about required characters and/or required types of characters, rules about capitalization, rules about maximum password length, and/or rules about minimum password length. The password space may be constructed by generating a list of passwords in a sequential manner using all possible combinations of numeric characters, alphabetical characters, non-alphanumeric characters, or any combinations thereof for all positions of the generated list of passwords. The list of passwords may be sequentially generated by cycling through all eligible characters for each character position in a given password, in a predetermined order for all eligible characters, until all possible combinations of passwords in the space are generated. In some embodiments, each of the passwords in the passwords space may be different from each other.

In some embodiments, the list of passwords in the password space may be generated in accordance with rules such that the passwords in the password space may be in non-alphabetical and/or non-alphanumeric order. For example, rules for generating the password space may generate passwords in the password space based on words in a dictionary, commonly-used character strings in passwords, known common passwords, and/or known or predicted character patterns and/or character type patterns based on known or common password security requirements (e.g., the requirement to include a capital letter, a number, and/or a symbol). In some embodiments, the order of passwords in the space may be generated based on, for example, a dictionary algorithm. In some embodiments, the order of passwords in the space may be generated based on, for example, the usage frequency of the dictionary words as passwords. That is, the passwords arranged in the space be ordered from the most frequently used passwords and/or patterns to the least frequently used passwords and/or patterns. In some embodiments, the list of passwords in the password space may be generated from dictionary words modified with numeric characters, alphabetical characters of one or more alphabets, symbolic characters, and/or non-alphanumeric characters.

In some embodiments, after generating passwords using dictionary words and/or known common passwords and/or known common character patterns, the exhaustive remainder of all possible passwords in the space using all possible characters may then be generated, but these remaining passwords may be listed in the password space after the dictionary and known- or assumed-common passwords. Thus, the list of passwords in the password space may be exhaustive (including all possible passwords for the space), but may include more likely (e.g., more common) passwords nearer to the beginning of the list and may include less likely (e.g., less common, more linguistically random) passwords nearer to the end of the list. In this way, when the password space is systematically reviewed in accordance with querying one or more probabilistic data structures representing subsets of the space, as explained herein, it may be more likely that the system discovers the correct password earlier in the ordered space. Ordering the password space in this way may accordingly further reduce processing times.

In some embodiments, the data representing the password space may be stored in any suitable manner, such as in a database, on any suitable computer storage or memory device.

Step 102 may be followed by step 104. At step 104, in some embodiments, the password space may be segmented into a plurality of password sets. The segmenting of the password space may be performed by a processor such as processor 702 of system 700 described below with reference to FIG. 7. In some embodiments, segmenting the password space may comprise generating and storing data indicating which of the passwords in the password space correspond to which sets. In some embodiments, the generated data may comprise metadata associated with the passwords in the password space, may comprise pointers, and/or may comprise data stored in one or more indexes defining the password sets.

Figure 2:
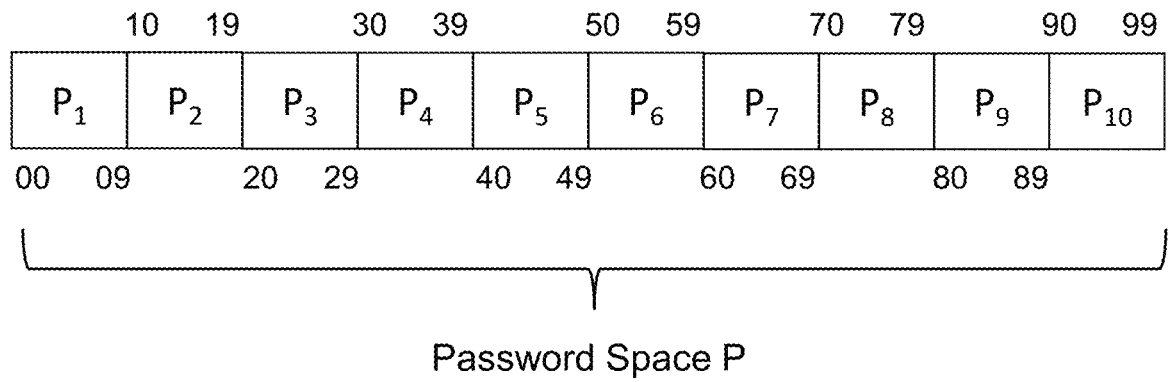
FIG. 2 illustrates segmenting of data in accordance with some embodiments.

In some embodiments, the password space may be segmented in a manner such that each of the password sets is a contiguous portion of the password space (as defined by the predetermined sequential order in which the passwords in the password space may be arranged) and is non-overlapping with each other password set. FIG. 2 illustrates such a segmented password space with an example password space P. Password space P in FIG. 2 may have all possible two digit passwords generated from numeric characters 0 through 9 (resulting in 100 total possible passwords, 00 through 99). The two digit passwords may be arranged in a sequential order from 00 to 99 in password space P. Password P may be segmented into ten equal sized password sets P1 through P10 as shown in FIG. 2. Also shown in FIG. 2, each of the password sets P1 through P10 are a contiguous portion of password space P and are non-overlapping with each other password set of password space P. The passwords in each password set are non-overlapping with the passwords in other password sets. It should be understood that password space P and password sets P1 through P10 are merely examples shown for illustrative purposes and are not intended to be limiting on the embodiments of the present disclosure.

In some embodiments, the password space may be segmented in a manner such that each password set of the plurality of password sets may have a size equal to or different from each other password set of the plurality of password sets. The size of a password set may be based on the number of passwords in the password set and/or based on the data size of one or more passwords in the password set. In some embodiments, the size of each password set of the plurality of password sets may be selected based on a desired performance characteristic (e.g., computational time or accuracy) of the password recovery method 100 that may be depend on the computational time for hashing the password sets at step 106 discussed below. Depending on the complexity of hash functions used at step 106, the size of the password sets may be selected to achieve the desired computational time of the password recovery method 100. For example, the size of the password sets selected for using complex hash functions such as for example Bcrypt at step 106 may be smaller than the size of the password sets selected for using simple hash functions such as for example MD5 at step 106. In some embodiments, the size of each password set of the plurality of password sets may be selected based on the storage space of a password recovery system such as system 700 that may be configured to perform the steps of password recovery method 100.

Step 104 may be followed by step 106. At step 106, in some embodiments, a digest set for each password set of the plurality of password sets may be generated using a hash function. The generation of the digest sets may be performed by a processor such as processor 702 of system 700 described below with reference to FIG. 7.

Figure 3:
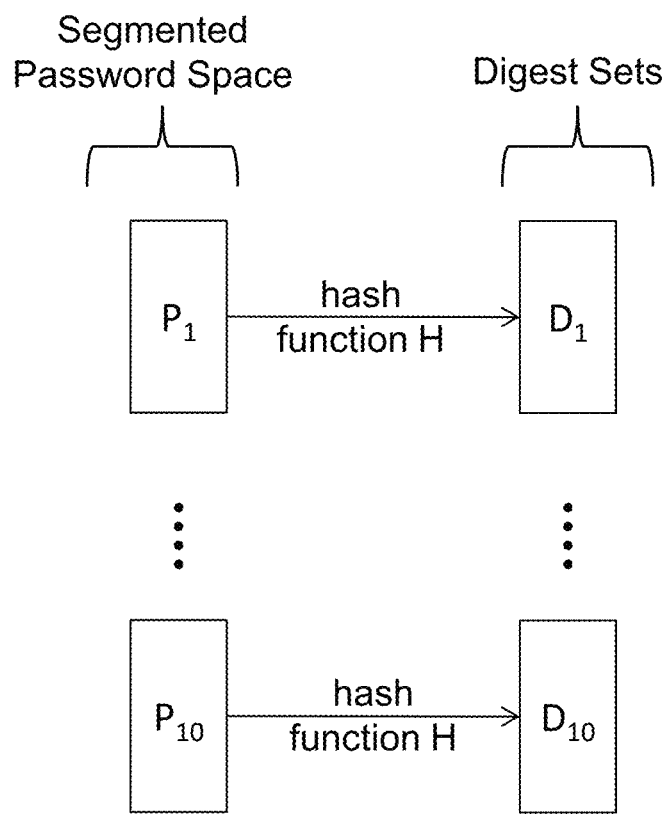
FIG. 3 illustrates encoding of segmented data in accordance with some embodiments.

In some embodiments, the generation of a digest for each password set may include hashing each of the passwords of each password set using a hash function, such as, for example, SHA-1, SHA-512, MD5, Bcrypt and/or other suitable cryptographic hash functions. Each digest set may include respective hash values of each of the passwords of the corresponding password set. For example, FIG. 3 illustrates generation of digest sets for a segmented password space having password sets P1 through P10. The password sets P1 through P10 may be similar to the passwords sets P1 through P10 discussed above with reference to FIG. 2. As shown in FIG. 3, digest sets D1 through D10 may be generated by hashing each of the passwords contained in each of respective password sets P1 through P10 using a hash function H. Each of digest sets D1 through D10 may comprise a plurality of hash values of the respective passwords of respective password sets P1 through P10. For example, digest set D1 may have ten hash values for the ten passwords 00 through 09 in password set P1. It should be understood that password sets P1 through P10 and digest sets D1 through D10 are merely examples shown for illustrative purposes and are not intended to be limiting on the embodiments of the present disclosure.

In some embodiments, hash values of the digest sets may include number characters, alphabetical characters, non-alphanumeric characters, or any combinations thereof. In some embodiments, the hash values of each digest set may be non-overlapping with the hash values of other digest sets.

In some embodiments, step 106 may be followed by step 108 or step 110.

Figure 4:
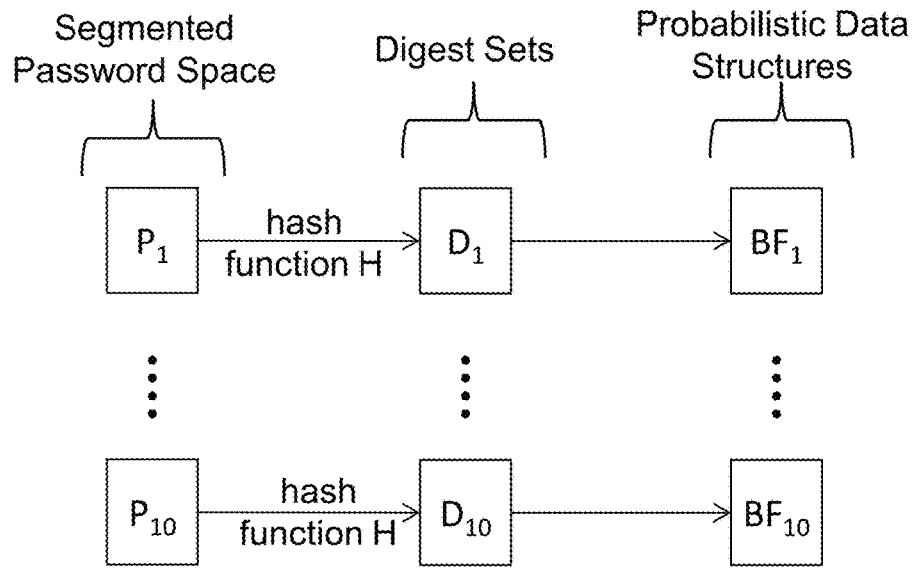
FIGS. 4-5 illustrate storing of encoded data using probabilistic data structures in accordance with some embodiments.

At step 108, for each of the digest sets, a probabilistic data structure may be generated and stored, wherein each of the probabilistic data structures represents each of the hashed passwords in each of the digest sets, wherein each hashed password is represented as a member of a set that defines the probabilistic data structure. For example, FIG. 4 illustrates generation of probabilistic data structures BF1 through BF10 for respective digest sets D1 through D10. As discussed further herein, each of digest sets D1 through D10 may be represented by a respective probabilistic data structure BF1 through BF10, in that each of the probabilistic data structures may be constructed to represent each of the hashed passwords contained in the corresponding digest set as a member of a set defining the probabilistic data structure. The password sets P1 through P10 and digest sets D1 through D10 may be similar to the passwords sets P1 through P10 and digest sets D1 through D10 discussed above with reference to FIG. 3. It should be understood that probabilistic data structures BF1 through BF10 and digest sets D1 through D10 are merely examples shown for illustrative purposes and are not intended to be limiting on the embodiments of the present disclosure.

In some embodiments, the probabilistic data structures may be generated by any suitable processor acting on hash values constituting the digest sets, and the probabilistic data structures may be built and stored on any suitable computer storage, computer memory, and/or database, or may be transmitted thereto for storage. In some embodiments, system 700 of FIG. 7 discussed below may generate the probabilistic data structures by performing one or more calculations and operations against the hash values constituting the digest sets generated at step 106 and may store the probabilistic data structures in storage 710 of system 700 discussed below with reference to FIG. 7.

In some embodiments, the probabilistic data structure generated at step 108 may be configured such that the data elements used to create the probabilistic data structure (e.g., the data upon which the probabilistic data structures was based or the input data used in the creation of the probabilistic data structures, such as the hash values constituting a given digest set as discussed above) may be unrecoverable from the probabilistic data structures. For example, the probabilistic data structures may comprise a one-way encoding algorithm (e.g., a hash function) that prevents the original elements from being recovered based on the probabilistic data structures. In some embodiments, the data elements may be unrecoverable due to an extremely intensive and/or computationally infeasible calculation or calculations that would be required to reverse the encoding and recover the elements. In some embodiments, the data elements may be unrecoverable in that reversal of the encoding may generate additional data elements that were not used in the creation or building of the probabilistic data structure, wherein those additional data elements may be indistinguishable from the data elements on which the probabilistic data structure was actually based; in this way, a party that reverses the encoding/compression process used in the creation of the probabilistic data structure to produce various data elements from the probabilistic data structure may not know which produced data elements were actually used to create the probabilistic data structure and which produced data elements are random, modified, and/or spoof data elements.

In some embodiments, the probabilistic data structures generated at step 108 may be configured to return no false negative results when each of the probabilistic data structures is queried to determine whether an element is a member of the probabilistic data structures. In some embodiments, the probabilistic data structures are configured to return false-positive results in accordance with a predefined probability when each of the probabilistic data structures is queried to determine whether an element is a member of the probabilistic data structures.

In some embodiments, probabilistic data structures that return no false negative results and a predefined and/or user-definable percentage of false positive results may have useful applications in password recovery as it may allow for a rapid lookup to determine, with a known error rate, whether a hash value query input is probably included or definitely not included in the digest sets. Determining the digest sets that definitely do not include the hash value query input may help to determine the password sets corresponding to these determined digest sets that definitely do not have the password of the hash value input. Thus, using probabilistic data structures may reduce the number of password sets that must be exhaustively searched for the password of the hash value input; as a result, using probabilistic data structures may therefore help to recover passwords substantially more quickly than if an exhaustive and error-free password search was made. In one example, for a given password space, a password recovery method using probabilistic data structures may take considerably less time, e.g., about six seconds, than the traditional methods that may be error-free but may take more than about 90 seconds.

Furthermore, in some embodiments, using probabilistic data structures for password recovery that returns no false negative results and a predefined and/or user-definable percentage of false positive results may conserve storage space, as the probabilistic data structures may be substantially smaller in size than an exhaustive list or other error-free data structure representing all of the digest sets. In some embodiments, an estimated size of a probabilistic data structure may be calculated based on the number of elements and the false positive rate selected, while the size of the input itself may not matter to the calculation of that size.

In some embodiments, the false positive probability of the probabilistic data structures may be selectable by a user or a system, such that a false positive probability may be selected and set and used in the generation of the probabilistic data structure. For example, a user may choose to create a probabilistic data structure configured to return false positive results at any suitable rate, such as 0.1%, 0.5%, 1%, 2%, 5%, 10%, 20%, 25%, 30%, 40%, or 45%. In some embodiments, a probabilistic data structure may be configured to return false positive results at a rate of 50% or more.

In some embodiments, the false positive probability may be selected based at least in part on storage and/or computing resources. For example, the lower the false positive probability, the more storage space may be required to store the probabilistic data structure and the more computational resources may be required to create/build the probabilistic data structure.

In some embodiments, the false positive probability may be selected based at least in part on requirements or considerations for accuracy and precision of comparisons to be made against the probabilistic data structure. For example, in some applications, such as those in which data sets for comparison are smaller, then higher false positive rates may degrade results substantially and unacceptably. However, in some applications, such as those in which data sets for comparison are larger (e.g., hundreds, thousands, or millions of elements to compare), then higher false positive rates may be acceptable as they may not impede the ability to draw meaningful conclusions from analysis of the probabilistic data structures.

In some embodiments, each of the probabilistic data structures generated at step 108 may be a Bloom filter, wherein each digest set generated at step 104 may be represented by a Bloom filter wherein each of the hash values constituting the respective digest sets are represented as an element of the set used to construct the corresponding Bloom filter.

A Bloom filter is a probabilistic data structure that may be used to determine whether an element is a member of a set. Unlike a set or traditional database, the data in a Bloom filter is irretrievable. When a Bloom filter is queried as to whether an element is a member of a set, the Bloom filter will provide zero false negative results, but may provide false positive results. Thus, a Bloom filter may be used to determine whether an element is "probably present" or "definitely not present" in a set. The rate at which false positive results are returned may be selected by a user at the time of the creation of a Bloom filter, such that a Bloom filter may be configured to have a predetermined probability of returning false positive results. The false positive rate of a Bloom filter is pre-defined with a correlation to the number of elements to be added to the filter. For example, a Bloom filter may be configured to return false positive results 40%, 30%, 20%, 10%, 5%, 2%, 1%, or less than 1% of the time.

Bloom filters are space-efficient, in that they require less disk space for storage and memory for comparison processes than error-free (e.g., 0% false positive) hashing techniques or other data structures for representing and searching sets (e.g., search trees, hash tables, arrays, or linked lists). In some embodiments, a Bloom filter having a 1% false positive probability may require less than 10 bits per element represented by the Bloom filter. The lower a false positive probability set of a Bloom filter, the larger the Bloom filter data structure will be; the higher the false positive probability, the smaller the Bloom filter data structure will be.

A Bloom filter has a zero false negative rate by virtue of how data is inserted and looked up. Upon insertion, each data point is hashed and converted into two or more bit positions. These bits are then set to true (1) within the bit array. It is possible that multiple data points overlap on one or more bits. When looking up a data point to see if it has been included, the data to be looked up is hashed in the same manner used to hash the original data. All bits are checked to verify that they are all set. If any bit is not set to true, one can be confident that the data point was never inserted.

In some embodiments, generating the probabilistic data structures at step 108 may comprise building a Bloom filter for each digest set generated at step 104. In some embodiments, a Bloom filter may be created for each of the digest sets by using the hash values constituting each of the digest sets as elements defining the mathematical set used for the creation of a Bloom filter at step 108. In some embodiments, a system may be configured to allow for parallel building, exporting and importing from disk, and importing and exporting in several file formats including hex strings of Bloom filters, binary, and reading directly from disk instead of loading into memory. In some embodiments, a system may enable storing statistics about a Bloom filter including the number of elements stored, desired false positive rate, and/or the maximum number of elements to stay below that false positive rate; in some embodiments, this information may be stored as metadata associated with one or more respective Bloom filters in any suitable storage arrangement, such as in a database of Bloom filters.

In some embodiments, each of the probabilistic data structures generated at step 108 may be stored separately and/or together on any suitable computer storage, such as storage 710 of system 700. In some embodiments, the probabilistic data structures may be transferred from a remote computing system to a local computing system such as system 700 of FIG. 7 via any electronic communication link, such as any suitable network communication link. In some embodiments, probabilistic data structures may be transferred one at a time or in one or more batches each including two or more probabilistic data structures. In some embodiments, an entire library of hundreds or thousands or more probabilistic data structures may be transferred at once. In some embodiments, such as when the plurality of probabilistic data structures constitute a large file size, the plurality of probabilistic data structures may be transferred by physical media, such as being transferred on one or more discs, thumb drives, hard drives, solid-state drives, or the like. For example, if the plurality of probabilistic data structures amount to several gigabytes in total size for several thousand probabilistic data structures, then the probabilistic data structures may be loaded onto portable storage media (or alternately transmitted by network communication) and then transferred to the local computing system.

At step 110, which may be performed alternatively or in addition to step 108, a multi-level probabilistic data structure may be generated and stored. As used herein, a multi-level probabilistic data structure may refer to a data structure comprising a plurality of probabilistic data structures arranged in a multi-level relationship, such as in a tree hierarchy. For example, in an example in which the probabilistic data structure referred to in step 106 is a Bloom filter, the multi-level probabilistic data structure here may comprise a plurality of Bloom filters arranged in a multi-level relationship. In particular, probabilistic data structures on different levels of the multi-level probabilistic data structure may represent different-sized portions of a password space, such that those structures in a higher level of the multi-level structure may represent a greater percentage of the entire password space, such as up to half of the entire password space. On the other hand, those structures in a lower level of the multi-level structure may represent a smaller percentage of the entire password space, such as 10%, 5%, 1%, or a smaller percentage of the entire password space. In some embodiments, structures in each of the levels of the multi-level structure may be arranged in a hierarchically linked relationship, such that those structures in different levels that correspond to the same overlapping portion of the underlying password space may be known to be vertically associated with one another, while those structures in different levels that do not correspond to the same overlapping portion of the underlying password space may be known to not be vertically associated with one another.

With reference to the password space, password sets, and digest sets discussed above, each level of a multi-level probabilistic data structure may comprise a plurality of probabilistic data structures and each probabilistic data structure may represent one or more of the digest sets. In some embodiments, the plurality of probabilistic data structures on each level may be created to have the same false positive rate. In some embodiments, the plurality of probabilistic data structures on each level may be created to have a false positive rate that is equal to or different from a false positive rate of the plurality of probabilistic data structures on other levels of the multi-level probabilistic data structure. In some embodiments, the multi-level probabilistic data structure may be arranged in a tree configuration, where each probabilistic data structure on each level may branch into two probabilistic data structures in the next level of the multi-level probabilistic data structure.

In some embodiments, a multi-level probabilistic data structure may have a tree structure as discussed above. For example, each of the digest sets may be represented by a respective probabilistic data structure on a first level of the multi-level probabilistic data structure, while, at a higher level of the multi-level structure, two digest sets may be represented by a single probabilistic data structure. At a higher-yet level of the multi-level probabilistic data structure, four digest sets may be represented by a single probabilistic data structure. Thus, in some embodiments, each probabilistic data structure on each level may represent half (or double) the number of digest sets as compared to the probabilistic data structures in adjacent levels. For those probabilistic data structures in adjacent levels representing all or part of the same portion of the password space as represented by a given probabilistic data structure, the probabilistic data structures in adjacent levels may be considered to be vertically associated with the given probabilistic data structure, and may be said to branch to/from the given probabilistic data structure.

Figure 5:
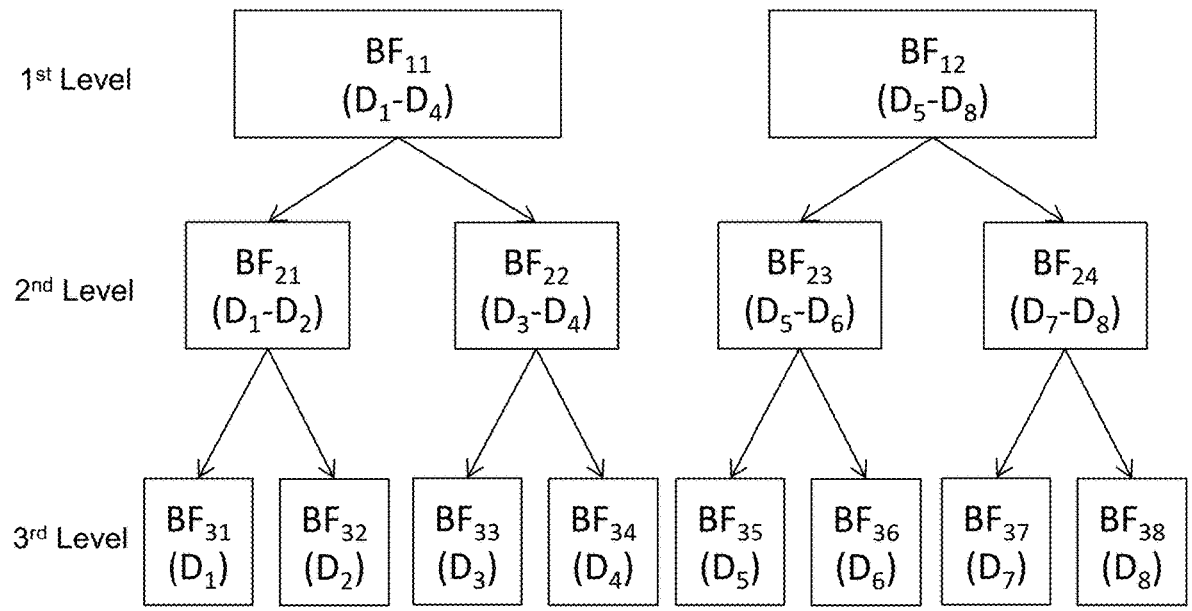

For example, FIG. 5 illustrates a configuration of a multi-level probabilistic data structure 500 that may be generated at step 110. As shown in FIG. 5, first level of the multi-level probabilistic data structure 500 may include two probabilistic data structures BF11 and BF12. Each of the two probabilistic data structures BF11 and BF12 may represent four digest sets. The two probabilistic data structures BF11 and BF12 may branch into two probabilistic data structures BF21 and BF22 and BF22 and BF24, respectively, on second level. Each of the probabilistic data structures on the second level may represent half the number of digest sets than the probabilistic data structures it branched out from the first level. For example, BF21 may represent digest sets D1 and D2, whereas BF11 represent digest sets D1 through D4.

The third level of the multi-level probabilistic data structure 500 having probabilistic data structures BF31 through BF38 may comprise probabilistic data structures that branch out of each of the probabilistic data structures on the second level. In a similar manner as the probabilistic data structures on the second level each represent half the number of digest sets as each of the probabilistic data structures on the first level, each of the probabilistic data structures on the third level may represent half the number of digest sets as each of the probabilistic data structures on the second level. The digest sets D1 through D8 may be similar to digest sets D1 through D8 discussed above with reference to FIG. 3. It should be understood that multi-level probabilistic data structures 500 and digest sets D1 through D8 are merely examples shown for illustrative purposes and are not intended to be limiting on the embodiments of the present disclosure.

In some embodiments, the representation of digest sets by the multi-level probabilistic data structure may help to further increase the processing speed of password recovery compared, for example, to processing speeds of password recovery systems relying on digest sets represented by a linear or single-level plurality of parallel probabilistic data structures, such as discussed above with reference to FIG. 4 and step 108 of FIG. 1. In one example, for a given password space and a hash value input, password recovery may be executed in about 0.02 seconds using the multi-level probabilistic structure of step 110 and in about 6 seconds using the linear probabilistic data structure of step 108.

In some embodiments, the probabilistic data structures of the multi-level probabilistic data structure generated at step 110 may be similar in structure and functionality to the probabilistic data structures described above with reference to step 108. In some embodiments, each of the probabilistic data structures of the multi-level probabilistic data structure generated at step 110 may be a Bloom filter.

Figure 6:
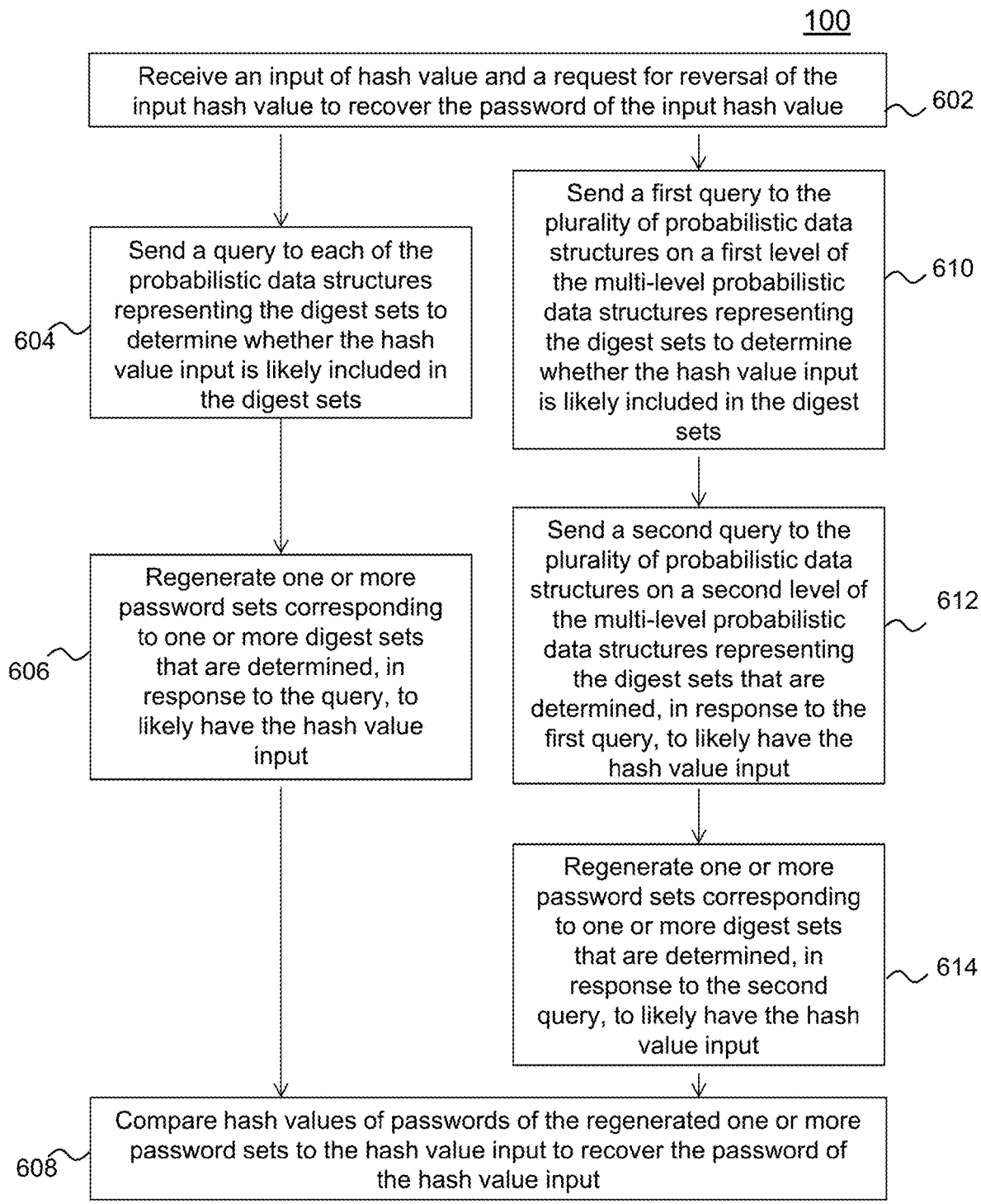
FIG. 6 show flow diagram depicting methods for recovering data through reversal of hash values using probabilistic data structures in accordance with some embodiments.

FIG. 6 is a flow diagram of the example password recovery method 100 during its reversal phase, according to some embodiments. In some embodiments, the reversal phase steps of the password recovery method 100 may be performed after the construction phase steps discussed above with reference to FIGS. 1-5. The method steps of FIG. 6 may be performed by a system such as system 700 described below with reference to FIG. 7.

At step 602, in some embodiments, a hash value input and a request for reversing the hash value input to recover the password associated with the hash value input may be received. That is, the system may receive a hash value for which a password is desired to be recovered. Thus, for a completely solved hashing algorithm for which the system has access to exhaustive knowledge of what underlying passwords correspond to what hash values, the system may need only find the matching hash value in a stored data structure in order to look up the corresponding plain text password. However, brute-force linear exhaustive searching of all possible passwords and/or all possible hash values may be computationally infeasible or impractical, as discussed above. Accordingly, a searching/reversal procedure utilizing probabilistic data structures as discussed herein may be executed in order to drastically shorten search times and improve computational efficiency. The input and request may be received by an input device such input device 706 of system 700 described below with reference to FIG. 7.

In some embodiments, step 602 may be followed by step 604 or by step 610. As explained in further detail below, steps 604 and 606 may constitute a single-level searching technique for searching linearly through a single level of probabilistic data structures. On the other hand, steps 610-614 may constitute a multi-level searching technique for searching through a multi-level probabilistic data structure.

At step 604, a query may be sent to each of the probabilistic data structures generated at step 108 of FIG. 1. The queries may be configured to cause the queried probabilistic data structure to generate output data indicating whether the hash value query input received at step 602 is likely included in any of the digest sets represented by the probabilistic data structures of step 108.

At step 606, which may be followed from step 604 in some embodiments, one or more password sets corresponding to one or more digest sets that are determined to likely include the hash value input may be regenerated in response to the query of step 604.

As discussed above, at step 604 the outputs generated by one or more of the queried probabilistic data structures may indicate that one or more of the digest sets likely include the hash value query input. In response to these outputs identifying the one or more digest set that are likely to have the hash value query input, the one or more password sets from which these one or more digest sets were generated at step 104 (FIG. 1) of the construction phase of the password recovery method 100 may be identified. The identification may be performed through metadata or some other information associated with the password sets and/or digest sets that may have been stored during step 104 (FIG. 1) to indicate the mapping of each password set to its corresponding generated digest set. For example, referring to FIG. 3, during the generation of digest sets D1 through D10 from respective password sets P1 through P10 at step 104 of FIG. 1, some mapping information may have been stored to associate passwords sets P1 through P10 with respective digest sets D1 through D10. Based on this mapping information, if the output of step 604 indicates, for example, that digest set D1 likely includes the hash value query input, then password set P1 is identified as the password set that corresponds to digest set D1 based on the mapping information stored at step 104 of FIG. 1. As illustrated in FIG. 3, the mapping may not be between each password to its corresponding hash value in the digest set, rather, the mapping may be between each password set and its corresponding digest set.

This identification of the one or more password sets may be followed by regeneration of the passwords that belong in the identified one or more password sets. This regeneration process may be performed because, in some embodiments, an exhaustive list of all passwords in each password set may not be durably or permanently stored by the system during the construction phase. That is, during or after the construction phase, exhaustive lists of all possible plain text passwords may be purged or otherwise discarded (e.g., to conserve memory space), so the system may not have immediate access to a list of all passwords contained in each password set. Rather, the system may have access to instructions for algorithmically systematically regenerating all passwords of a password set, which may be undertaken on a limited and computationally feasible basis once the probabilistic-data-structure-based search techniques disclosed herein have been used to drastically narrow the region in the password space where the targeted password is suspected to be located. The passwords may be regenerated based on the password generation rules initially used to generate all the passwords of the password space during step 102 (FIG. 1). However, at this step 606, the password generation rules may be used to selectively regenerate the passwords belonging to the one or more password sets identified based on the output of step 604 as discussed above. For example, referring to the password space and password sets of FIG. 2, if based on the output of step 604, password set P1 is identified as corresponding to a digest set D1 that likely includes the hash value query input, then passwords of password set P1 may be selectively regenerated without the regeneration of the passwords of other password sets P2 through P10 of the password space. That is, passwords 00 through 09 of password set P1 may be regenerated based on the password generation rules that may have been used to generate these passwords of password set P1 during step 104 of FIG. 1.

At step 608, hash values of passwords of the regenerated one or more password sets may be compared to the hash value input received at step 602 to recover the password of the hash value input. For example, a hash value of each regenerated password may be calculated and may be stored and/or analyzed in association with the plain text password from which it was generated. The hash value, which may be calculated in a similar or identical manner to the calculation if digest values explained above, may be compared to the hash value input to check for a match. If the hash value input matches the newly generated hash value, then the system may determine that the hash value input is associated with the password from which the newly generated hash value was just calculated, and may determine that the hash value input is a hash of that same plain text password. Thus, the system may determine the password itself, and may generate, store, and/or transmit one or more indications of the retrieved password.

Alternatively or additionally to steps 606 and 608, the method may proceed from step 604 to step 610. At step 610, a first query may be sent to each of the plurality of probabilistic data structures on a first level of the multi-level probabilistic data structure generated at step 110 of FIG. 1. The first query may be sent to determine whether the hash value input received at step 602 is likely included in any of the digest sets represented by the probabilistic data structures on the first level of the multi-level probabilistic data structure. For example, in some embodiments, the first level may comprise two Bloom filters each representing half of the entire digest space, and querying each of the Bloom filters may generate a single positive output indicating which half of the digest space likely contains a match.

At step 612, a second query may be sent to the plurality of probabilistic data structures on a second level of the multi-level probabilistic data structure that represent the digest sets that are determined, in response to the first query, to likely have the hash value input. That is, only probabilistic data structures in the second level corresponding to the same digest sets for which a positive result was obtained at step 610 may be queried in step 612, while those probabilistic data structures in the second level that do not correspond to the same digest sets for which a positive result was obtained at 610 may not be queried at step 612. Put another way, the system may start at a probabilistic data structure in the first level for which a positive result is returned, and may proceed to only those probabilistic data structures in the second level that branch from the probabilistic data structure in the first level. In this way, the system may iteratively narrow the number of candidate digest sets at each level of the multi-level probabilistic data structure by using each level to narrow the potential digest space to which the positive result is attributable. The second query may be sent to determine where these digest sets likely include the hash value input.

For example, in some embodiments, the second level may comprise four Bloom filters each representing one quarter of the digest space, and the system may query the two (of four total) second-level Bloom filters that correspond to the half of the digest space associated with a positive result from the first-level query. By querying each of those two Bloom filters, the system may generate a single positive output indicating which quarter of the digest space likely contains a match.

At step 614, which may be followed from step 612 in some embodiments, one or more password sets corresponding to one or more digest sets that are determined to likely include the hash value input may be regenerated in response to the second query of step 612. In some embodiments, step 614 may share any one or more characteristics in common with step 606.

Following step 614, the method may proceed to step 608 as described above.

Figure 7:
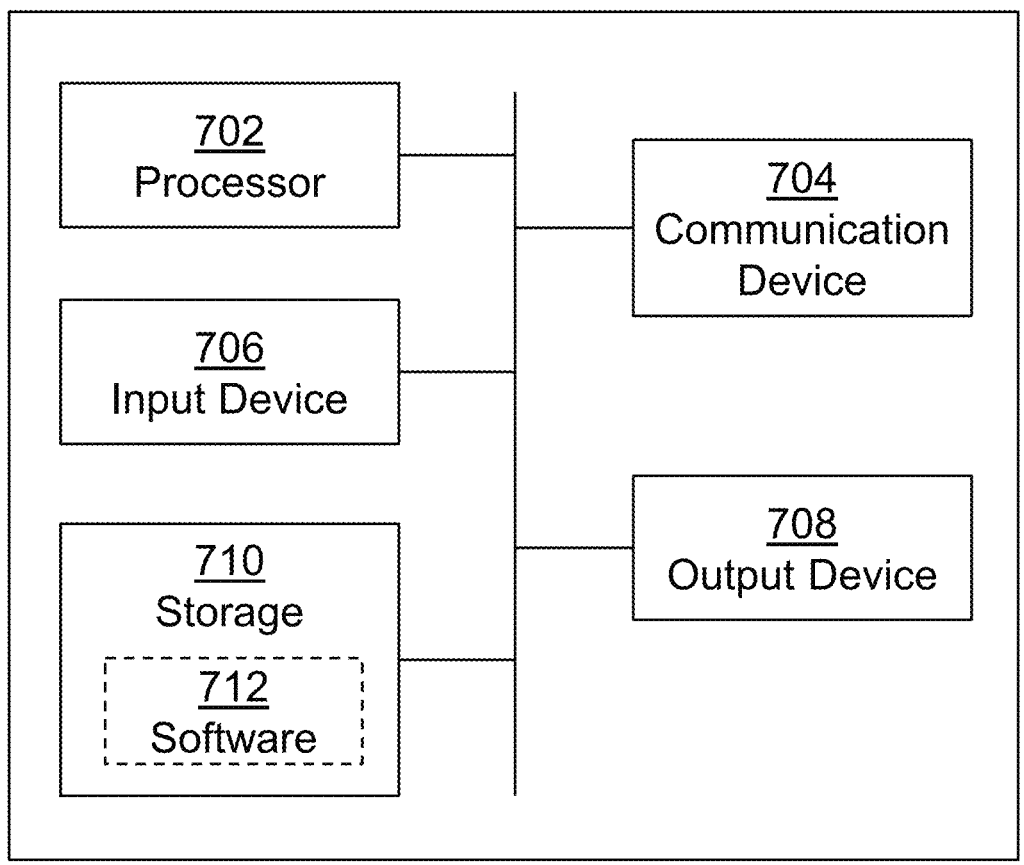
FIG. 7 shows a data recovery system in accordance with some embodiments.

FIG. 7 depicts a password recovery system 700, in accordance with some embodiments, that is configured to perform one or more software processes that, when executed, provide one or more aspects of the disclosed embodiments. In some embodiments, system 700 may be configured to perform password recovery method steps discussed above with reference to FIGS. 1 and 6. FIG. 7 is not intended to be limiting to the disclosed embodiment as the components used to implement the processes and features disclosed herein may vary.

In some embodiments, system 700 may comprise one or more of processors 702, communication device 704, input device 706, output device 708, storage 710, and/or software 712 stored on storage 710 and executable by processor 702. The components of the computer can be connected in any suitable manner, such as via one or more physical buses or wirelessly.

In some embodiments, system 700 may include server-side computing components as well as client-side computing components. The specific elements shown in FIG. 7 may, in some embodiments, be included in a server-side computer and/or may, in some embodiments, be included in a client-side computer. In some embodiments, system 700 may include server-side components and client-side components that are in communication with one another via one or more instances of communication device 704, which may, for example, enable communication of server-side components and client-side components over a network connection.

In some embodiments, some or all components of system 700 may be part of a distributed computing system (e.g., a cloud computing system). In some embodiments of the techniques disclosed herein, for example, storage 710 may be storage provisioned by a cloud computing system, such that a user may send instructions to the cloud computing system over one or more network connections, and the cloud computing system may execute the instructions in order to leverage the cloud computing components in accordance with the instructions. In some embodiments, cloud computing systems may be configured to be capable of executing the same or similar program code in the same programming languages as other systems (e.g., servers, personal computers, laptops, etc.) as discussed herein.

Processor 702 may be any suitable type of computer processor capable of communicating with the other components of system 700 in order to execute computer-readable instructions and to cause system 700 to carry out actions in accordance with the instructions. For example, processor 700 may access a computer program (e.g., software 712) that may be stored on storage 710 and execute the program to cause the system to perform various actions in accordance with the program. In some embodiments, a computer program or other instructions executed by processor 702 may be stored on any transitory or non-transitory computer-readable storage medium readable by processor 702.

In some embodiments, processor 702 may include one or more known processing devices, such as a microprocessor from the Pentium™ family manufactured by Intel™ or the Turion™ family manufactured by AMD™. Processor 702 may include a single core or multiple core processor system that provides the ability to perform parallel processes simultaneously. For example, processing unit 711a may include a single core processor that is configured with virtual processing technologies known to those skilled in the art. In certain embodiments, processor 702 may use logical processors to simultaneously execute and control multiple processes. The one or more processors in processor 702 may implement virtual machine technologies, or other similar known technologies, to provide the ability to execute, control, run, manipulate, store, etc., multiple software processes, applications, programs, etc. In another embodiment, processor 702 may include a multiple-core processor arrangement (e.g., dual or quad core) that is configured to provide parallel processing functionalities to allow system 700 to execute multiple processes simultaneously. Other types of processor arrangements, such as those used in Cray supercomputers, could be implemented to provide for the capabilities disclosed herein.

Communication device 704 may include any suitable device capable of transmitting and receiving signals over a network, such as a network interface chip or card. System 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Input device 706 may be any suitable device that provides input, such as a touchscreen or monitor, keyboard, mouse, button or key or other actuatable input mechanism, microphone, and/or voice-recognition device, gyroscope, camera, or IR sensor. Output device 708 may be any suitable device that provides output, such as a touchscreen, monitor, printer, disk drive, light, speaker, or haptic output device. Input device 706 and/or output device 708 may include components configured to send and/or receive information between components of system 700.

Storage 710 can be any suitable device the provides storage, such as an electrical, magnetic or optical memory including a RAM, cache, hard drive, CD-ROM drive, tape drive, or removable storage disk. In some embodiments, storage 710 may include instructions that, when executed by one or more processors of processor 702, perform one or more processes consistent with the functionalities disclosed herein. Storage 710 may also include any combination of one or more databases controlled by memory controller devices (e.g., server(s), etc.) or software, such as document management systems, Microsoft SQL databases, SharePoint databases, Oracle™ databases, Sybase™ databases, or other relational databases. In some embodiments, storage 710 may contain or be communicatively coupled to any one or more of the databases discussed herein.

In some embodiments, instructions, application programs, etc., may be stored in an external storage or available from a memory over a public or private network to which system 700 is communicatively coupled. The one or more processors in processor 702 may execute one or more programs located remotely from system 700. For example, system 700 may access one or more remote programs, that, when executed, perform functions related to disclosed embodiments. Storage 710 may include one or more memory devices that store data and instructions used to perform one or more features of the disclosed embodiments.

Software 712, which may be stored in storage 710 and executed by processor 702, may include, for example, the programming that embodies the functionality of the methods, techniques, and other aspects of the present disclosure (e.g., as embodied in the computers, servers, and devices as described above). In some embodiments, software 712 may include a combination of servers, such as application servers and database servers.

Methods, systems, and articles of manufacture consistent with disclosed embodiments are not limited to separate programs or computers configured to perform dedicated tasks. For example, system 700 may include storage that may include one or more programs to perform one or more functions for recovering password using method as described above with reference to FIGS. 1 and 6.

Software 712 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 710, that can contain or store programming for use by or in connection with an instruction execution system, apparatus, or device.

Software 712 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

System 700 can implement any one or more operating systems suitable for operating on the network. Software 712 can be written in any one or more suitable programming languages, such as C, C++, Java, or Python. In various embodiments, application software embodying the functionality of the present disclosure can be deployed in different configurations, such as in a client/server arrangement or through a Web browser as a Web-based application or Web service, for example.

Although the description herein uses terms first, second, etc. to describe various elements, these elements should not be limited by the terms. These terms are only used to distinguish one element from another.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The invention claimed is:

1. A method for recovering a password from a hash value input, the method comprising:

segmenting a password space into a plurality of password sets, wherein each of the password sets comprise a plurality of passwords in the password space;

generating and storing a digest set for each password set of the plurality of password sets, wherein each of the digest sets comprises a respective hash value of each of the respective passwords in the corresponding password set;

generating and storing a plurality of probabilistic data structures, wherein each of the plurality of probabilistic data structures represents one of the plurality of the digest sets, wherein generating each of the the plurality of probabilistic structures comprises selecting a predefined false-positive probability for queries of the probabilistic data structure based on a size of storage resources on which the probabilistic data structure is to be stored;

querying one of the probabilistic data structures with the hash value input to determine whether the hash value input is likely included in the digest sets represented by the probabilistic data structures;

receiving, in response to the querying of the probabilistic data structure, result data from the probabilistic data structure indicating that the hash value input is likely included in the digest set represented by the probabilistic data structure;

in response to receiving the result data indicating that the hash value input is likely included in the digest set represented by the probabilistic data structure, generating and storing the passwords constituting the password set corresponding to the digest set, and generating and storing the hash values constituting the digest set;

comparing the generated hash values constituting the digest set to the hash value input to determine a hash value from among the digest set that matches the hash value input; and generating and outputting an indication of the generated password associated with the hash value from among the digest set that matches the hash value input.

2. The method of claim 1, wherein segmenting the password space comprises generating and storing data representing the plurality of password sets in the password space.

3. The method of claim 1, wherein the password space is comprises all possible passwords in accordance with a plurality of rules governing password eligibility.

4. The method of claim 1, wherein passwords in the password space are arranged in an order in accordance with one or more predefined ordering criteria.

5. The method of claim 4, wherein each password set of the plurality of password sets comprises a contiguous portion of the password space as defined by the predefined ordering criteria, and is non-overlapping with each other password sets of the plurality of password sets.

6. The method of claim 1, wherein each password set of the plurality of password sets comprises an equal number of passwords.

7. The method of claim 1, wherein generating a digest set for each password set comprises calculating a respective hash value for each password of the password set.

8. The method of claim 1, wherein the probabilistic data structure is configured to generate result data indicating either:
that the query input value is likely included in the digest set represented by the probabilistic data structure, or
that the query input value is definitely not included in the digest set represented by the probabilistic data structure.

9. The method of claim 1, wherein the probabilistic data structure is a Bloom filter.

10. A system for recovering a password from a hash value input, the system comprising:
one or more processors;
a memory storing one or more programs, the one or more programs configured to be executed by the one or more processors and including instructions to:
segment a password space into a plurality of password sets, wherein each of the password sets comprise a plurality of passwords in the password space;
generate and store a digest set for each password set of the plurality of password sets, wherein each of the digest sets comprises a respective hash value of each of the respective passwords in the corresponding password set;
generate and store a plurality of probabilistic data structures, wherein each of the plurality of probabilistic data structures represents one of the plurality of the digest sets, wherein generating each of the the plurality of probabilistic structures comprises selecting a predefined false-positive probability for queries of the probabilistic data structure based on a size of storage resources on which the probabilistic data structure is to be stored;
query one of the probabilistic data structures with the hash value input to determine whether the hash value input is likely included in the digest sets represented by the probabilistic data structures;
receive, in response to the querying of the probabilistic data structure, result data from the probabilistic data structure indicating that the hash value input is likely included in the digest set represented by the probabilistic data structure;
in response to receiving the result data indicating that the hash value input is likely included in the digest set represented by the probabilistic data structure, generate and store the passwords constituting the password set corresponding to the digest set, and generate and store the hash values constituting the digest set;
compare the generated hash values constituting the digest set to the hash value input to determine a hash value from among the digest set that matches the hash value input; and
generate and output an indication of the generated password associated with the hash value from among the digest set that matches the hash value input.

11. A non-transitory computer-readable storage medium storing one or more programs for recovering a password from a hash value input, the one or more programs configured to be executed by one or more processors and including instructions to:
segment a password space into a plurality of password sets, wherein each of the password sets comprise a plurality of passwords in the password space;
generate and store a digest set for each password set of the plurality of password sets, wherein each of the digest sets comprises a respective hash value of each of the respective passwords in the corresponding password set;
generate and store a plurality of probabilistic data structures, wherein each of the plurality of probabilistic data structures represents one of the plurality of the digest sets, wherein generating each of the the plurality of probabilistic structures comprises selecting a predefined false-positive probability for queries of the probabilistic data structure based on a size of storage resources on which the probabilistic data structure is to be stored;
query one of the probabilistic data structures with the hash value input to determine whether the hash value input is likely included in the digest sets represented by the probabilistic data structures;
receive, in response to the querying of the probabilistic data structure, result data from the probabilistic data structure indicating that the hash value input is likely included in the digest set represented by the probabilistic data structure;
in response to receiving the result data indicating that the hash value input is likely included in the digest set represented by the probabilistic data structure, generate and store the passwords constituting the password set corresponding to the digest set, and generate and store the hash values constituting the digest set;
compare the generated hash values constituting the digest set to the hash value input to determine a hash value from among the digest set that matches the hash value input; and
generate and output an indication of the generated password associated with the hash value from among the digest set that matches the hash value input.

12. A method for recovering a password from a hash value input, the method comprising:
segmenting a password space into a plurality of password sets, wherein each of the password sets comprise a plurality of passwords in the password space;

generating and storing a digest set for each password set of the plurality of password sets, wherein each of the digest sets comprises a respective hash value of each of the respective passwords in the corresponding password set;

generating and storing a multi-level probabilistic data structure, wherein the generating and storing comprising:

generating and storing a first plurality of probabilistic data structures in a first level of the multi-level probabilistic data structure; and generating and storing a second plurality of probabilistic data structures in a second level of the multi-level probabilistic data structure, wherein each of the probabilistic data structures of the multi-level probabilistic data structure respectively represent one or more of the plurality of the digest sets, wherein generating each of the probabilistic data structures comprises selecting a predefined false-positive probability for queries of the probabilistic data structure based on a size of storage resources on which the probabilistic data structure is to be stored;

querying a plurality of probabilistic data structures of the multi-level probabilistic data structure with the hash value input to determine whether the hash value input is likely included in any one or more of the digest sets respectively represented by the plurality of probabilistic data structures;

receiving, in response to the querying of the plurality of probabilistic data structures of the multi-level probabilistic data structure, result data from an identified one of the plurality of data structures indicating that the hash value input is likely included in the digest set represented by the identified probabilistic data structure;

in response to receiving the result data indicating that the hash value input is likely included in the digest set represented by the identified probabilistic data structure, generating and storing the passwords constituting the password set corresponding to the digest set, and generating and storing the hash values constituting the digest set;

comparing the generated hash values constituting the digest set to the hash value input to determine a hash value from among the digest set that matches the hash value input; and generating and outputting an indication of the generated password associate with the hash value from among the digest set that matches the hash value input.

13. The method of claim 12, wherein the multi-level probabilistic data structure comprises a tree-structure of probabilistic data structures in which a given probabilistic data structure in the first level is associated with multiple probabilistic data structures in the second level.

14. The method of claim 13, wherein:
each of the multiple probabilistic data structures in the second level are represent single respective digest sets; and the given probabilistic data stricture in the first level represents all of the respective digest sets represented by each of the multiple probabilistic data structures in the second level.

15. The method of claim 14, wherein querying a plurality of probabilistic data structures of the multi-level probabilistic data structure comprises:

querying the given probabilistic data structure of the first level of the multi-level probabilistic data structure;

receiving, in response to the querying of the given probabilistic data structure, result data indicating that the hash value input is likely included in one of the multiple digest sets represented by the given probabilistic data structure;

in accordance with receiving the result data indicating that the hash value input is likely included in one of the multiple digest sets represented by the given probabilistic data structure, querying the multiple probabilistic data structures of the second level of the multi-level probabilistic data structure;

receiving, in response to the querying the multiple probabilistic data structures of the second level, the result data indicating that the hash value input is likely included in the digest set represented by the identified probabilistic data structure, wherein the identified probabilistic data structure is one of the multiple probabilistic data structures.

16. The method of claim 12, wherein:
the first plurality of probabilistic data structures are configured to have a first false-positive rate; and
the second plurality of probabilistic data structures are configured to have a second false-positive rate different from the first false-positive rate.

17. A system for recovering a password from a hash value input, the system comprising:
one or more processors;
a memory storing one or more programs, the one or more programs configured to be executed by the one or more processors and including instructions to:

segment a password space into a plurality of password sets, wherein each of the password sets comprise a plurality of passwords in the password space;

generate and store a digest set for each password set of the plurality of password sets, wherein each of the digest sets comprises a respective hash value of each of the respective passwords in the corresponding password set;

generate and store a first plurality of probabilistic data structures in a first level of a multi-level probabilistic data structure; and generate and store a second plurality of probabilistic data structures in a second level of the multi-level probabilistic data structure, wherein each of the probabilistic data structures of the multi-level probabilistic data structure respectively represent one or more of the plurality of the digest sets, wherein generating each of the probabilistic data structures comprises selecting a predefined false-positive probability for queries of the probabilistic data structure based on a size of storage resources on which the probabilistic data structure is to be stored;

query a plurality of probabilistic data structures of the multi-level probabilistic data structure with the hash value input to determine whether the hash value input is likely included in any one or more of the digest sets respectively represented by the plurality of probabilistic data structures;

receive, in response to the querying of the plurality of probabilistic data structures of the multi-level probabilistic data structure, result data from an identified one of the plurality of data structures indicating that the hash value input is likely included in the digest set represented by the identified probabilistic data structure;

in response to receiving the result data indicating that the hash value input is likely included in the digest set represented by the identified probabilistic data structure, generate and store the passwords constituting the password set corresponding to the digest set, and generate and store the hash values constituting the digest set;

compare the generated hash values constituting the digest set to the hash value input to determine a hash value from among the digest set that matches the hash value input; and generate and output an indication of the generated password associate with the hash value from among the digest set that matches the hash value input.

18. A non-transitory computer-readable storage medium storing one or more programs for recovering a password from a hash value input, the one or more programs configured to be executed by one or more processors and including instructions to:

segment a password space into a plurality of password sets, wherein each of the password sets comprise a plurality of passwords in the password space;

generate and store a digest set for each password set of the plurality of password sets, wherein each of the digest sets comprises a respective hash value of each of the respective passwords in the corresponding password set;

generate and store a first plurality of probabilistic data structures in a first level of a multi-level probabilistic data structure; and generate and store a second plurality of probabilistic data structures in a second level of the multi-level probabilistic data structure, wherein each of the probabilistic data structures of the multi-level probabilistic data structure respectively represent one or more of the plurality of the digest sets, wherein generating each of the probabilistic data structures comprises selecting a predefined false-positive probability for queries of the probabilistic data structure based on a size of storage resources on which the probabilistic data structure is to be stored;

query a plurality of probabilistic data structures of the multi-level probabilistic data structure with the hash value input to determine whether the hash value input is likely included in any one or more of the digest sets respectively represented by the plurality of probabilistic data structures;

receive, in response to the querying of the plurality of probabilistic data structures of the multi-level probabilistic data structure, result data from an identified one of the plurality of data structures indicating that the hash value input is likely included in the digest set represented by the identified probabilistic data structure;

in response to receiving the result data indicating that the hash value input is likely included in the digest set represented by the identified probabilistic data structure, generate and store the passwords constituting the password set corresponding to the digest set, and generate and store the hash values constituting the digest set;

compare the generated hash values constituting the digest set to the hash value input to determine a hash value from among the digest set that matches the hash value input; and generate and output an indication of the generated password associate with the hash value from among the digest set that matches the hash value input.

* * * * *

UNITED STATES PATENT AND TRADEMARK OFFICE
CERTIFICATE OF CORRECTION

| | |
|---|---|
| PATENT NO. | : 11,055,399 B2 |
| APPLICATION NO. | : 16/253950 |
| DATED | : July 6, 2021 |
| INVENTOR(S) | : Mark Sanders and Tyler Barrus |

Page 1 of 1

It is certified that error appears in the above-identified patent and that said Letters Patent is hereby corrected as shown below:

In the Claims
In Claim number 1, at Column 22, Line number 45, delete duplicate "the".
In Claim number 10, at Column 23, Line number 55, delete duplicate "the".
In Claim number 11, at Column 24, Line number 34, delete duplicate "the".

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*